United States Patent Office 3,435,026
Patented Mar. 25, 1969

3,435,026
PROCESS FOR THE RECOVERY OF NICOTINIC ACIDAMIDE-ADENINE DINUCLEOTIDE
Horotoshi Samejima, Hiroshi Teranishi, and Takashi Deguchi, Tokyo-to, Japan, assignors to Kyowa Hakko Kogyo Co., Ltd. (Kyowa Hakko Kogyo Kabushiki Kaisha), Tokyo-to, Japan, a body corporate of Japan
No Drawing. Filed Aug. 16, 1966, Ser. No. 572,672
Claims priority, application Japan, Aug. 23, 1965, 40/51,067; Sept. 3, 1965, 40/53,615
Int. Cl. C08b 19/00
U.S. Cl. 260—211.5                      10 Claims

ABSTRACT OF THE DISCLOSURE

A process for recovering nicotinic acidamide—adenine-dinucleotide from crude aqueous solutions by contacting the crude solution with a weakly basic anionic exchange resin which has been degenerated to its free base form, and which has been washed with water or with a salt solution until the washings therefrom are at a pH of less than 9.

---

The present invention relates to a process of recovering pure nicotinic acidamide-adenine-dinucleotide. More particularly, the present invention relates to a process of recovering pure nicotinic acidamide-adenine-dinucleotide (hereinafter called NAD) from an aqueous solution which contains crude NAD and impurities such as various other nucleotides, decomposed products of NAD, intermediates of NAD biosynthesis etc.

NAD is also called diphosphorpyridine-nucleotide (DPN) or codehydrogenase I (CoI) and is an essential substance as a coenzyme, which is utilized in various oxido-reductive reactions of living bodies. Since NAD has a very important role for energy metabolism and biosynthesis, it has been increasingly utilized for biological, medical and biochemical purposes.

As well known, NAD has been conventionally prepared by the extraction from yeasts and animal tissues while attempts have been made to recover large amounts of NAD from the microbial fermentation broths. However, it has been difficult to recover NAD from either the aqueous extract solution or aqueous fermentation broth due to the fact that these solutions contain various impurities, e.g. other nucleotides, decomposed products of NAD, intermediates of NAD and the like which are difficult to remove from the solution. In addition, NAD is chemically very unstable because it decomposes easily even at room temperature in an alkali or basic pH region of more than about 9, or at elevated temperatures under acidic conditions (at a pH of not more than about 1). Therefore it has been extremely difficult to apply conventional methods for removing the impurities of the extract or fermentation solution.

Conventional processes for the purification of crude aqueous solutions of NAD utilize such methods as silver salt precipitation, absorption with active charcoal etc. But such processes have been found to be extremely disadvantageous due to the lack of selectively in isolating NAD from other nucleotides. Furthermore, these materials used in such processes have proven to be hazardous and expensive.

It is also known to pass the crude NAD solution through a bed containing a specific weakly acidic cation exchange resin which absorbs NAD. The NAD is then eluted from the resin with an aqueous solution of ammonium acetate. But this process is extremely disadvantageous due to the fact that the ammonium acetate must be separated from the eluted solution. This separation has been found to be a difficult and expensive procedure.

Another known process is to pass the crude solution through a bed containing a strong basic anion exchange resin which will absorb NAD. The NAD is eluted from the resin by means of converting the NAD to its salt form. However, this process has proven to be disadvantageous due to the fact that a large amount of NAD remains unrecovered and due to the fact that these resins have been unable to selectively remove NAD from many of the other nucleotides in the crude solution.

The present inventors have now discovered a new and improved process of purifying NAD contained in a crude aqueous solution of NAD which results from fermentation or extraction from natural materials and which contain other nucleotides, decomposed products of NAD intermediates of NAD biosynthesis and the like as impurities by selectively removing these impurities from the crude aqueous solution.

Therefore, an object of the present invention is to provide a process of purifying NAD contained in crude aqueous NAD solution which results from fermentation or extraction from natural materials and which contains other nucleotides, decomposed products of NAD, intermediates of NAD biosynthesis and the like as impurities.

Other objects and features of the present invention will be apparent as the detailed description proceeds.

In accordance with this invention we have discovered that a crude aqueous solution containing nicotinic acidamide adenine dinucleotide (NAD) and impurities such as various nucleotides, decomposed products of nicotinic acidamide adenine dinucleotide, intermediates of the biosynthesis of nictonic acidamide adenine dinucleotide etc., can be treated so that these impurities can be removed therefrom without diminishing or effecting the content of the NAD so that the NAD can easily be recovered in pure form from the solution. This treating step is performed by first acidifying the crude solution to adjust the pH of the crude solution to at most 2. After the pH has been adjusted, the crude solution is passed through a bed of a weakly basic anion exchange resin regenerated in its free base form. The bed absorbs all of these impurities from the crude solution so as to leave an aqueous solution containing pure NAD from which the pure NAD may be easily recovered by any of the conventional methods such as evaporation, precipitation etc. Hence by means of this process, NAD can be easily and economically recovered in great quantities and in pure form.

The weakly basic anion exchange resins which are generally utilized in accordance with this invention, contain functional groups selected from primary, secondary, and tertiary amine groups in their skeletal structures. Before use, the amine group is regenerated in the form of its free base. However, the three basic forms of the anion ion exchange resin should be washed with water or neutral salt solution until the pH of the washings is less than 9, since a pH higher than 9 will decompose the NAD. Therefore any conventional weakly basic anion exchange resin having aforementioned amine groups and being regenerated as just mentioned can be utilized for the purpose of the present invention.

The crude NAD solutions generally contain other nucletiodes such as adenosine phosphates, guanosine phosphates, decomposed products or intermediates of NAD such as adenine, nicotinic acid, nicotinic acid amide etc. as impurities.

In accordance with the process of the present invention, the pH of the crude NAD solution is first adjusted to not more than 2.0, preferably to not more than 1.0. This is because crude NAD solutions under such acidic conditions are stable even at ambient temperatures and good separation of NAD from the aforesaid impurities is achieved. Therefore in accordance with this invention it has been found to be necessary to maintain the crude solution at this high acid pH during the step of passing the solution through the anion ion exchange resin bed to achieve separation of NAD from aforesaid impurities.

Weakly basic anion exchange resins used in the present invention should have primary, secondary and/or tertiary amine groups as their functional groups. For example, Duolite A-7, Duolite A-2 (trade names of the weakly basic anion exchange resins available from Chemical Process Co., U.S.A.); and Amberlite IR 45 (a trade name of a weakly basic anion exchange resin available from Rohm & Haas Co., U.S.A.) can be advantageously utilized as the anion exchange resin in accordance with this invention. After this resin has absorbed sufficient impurities from the solution, the resin can be regenerated into the form of its free base by washing or treating this resin with a suitable alkaline substance, e.g., caustic soda, and thereafter washing the resin with water until the washings obtained from the resin have a pH of not more than about 9.0. Resins insufficiently washed with water can give rise to increase pH of the initial fractions containing NAD to more than 9 and result in the disadvantageous decomposition of NAD.

It is also found that, after the regeneration into the form of the free base the resins can be preferably washed with a suitable salt solution e.g., aqueous solutions of $NaCl$, $NH_4Cl$, $(NH_4)_2SO_4$ etc.; or a suitable buffer solution of the known types and then washed with water. As a result, the free base form of the resin is mixed with a small amount of the salt form of the resin, can also be utilized for the process according to the present invention.

Weakly basic anion exchange resins in the free base form readily absorb impurities such as other nucleotides, decomposition products of NAD and intermediates in the NAD biosynthesis, but do not readily absorb NAD, when contacted with an aqueous solution having a small pH of not more than 2.0. If weakly basic anion exchange resins are used in their salt forms such as the acetate form and chloride form, NAD is much more retained in the resin and thus it causes much more separation of NAD from the impurities. Also, if a crude NAD solution having a pH of more than 2 is used, a similar tendency may be observed. The resin can advantageously be used as a fixed bed and the aqueous solution of NAD to be purified is passed down through there. It has been found that earlier fractions of the effluent contain only NAD, and impurities such as adenosine monophosphate appear in later fractions. The operations should be carried out at ambient or lower temperatures.

The eluted fractions being also contaminated with the impurities such as adenosine monophosphate (hereinafter designated as AMP) are then preferably passed down through another resin column in an analogous manner to that described above so as to isolate NAD from impurities such as AMP. Meanwhile, other impurities such as adenosine diphosphate (hereinafter designated as ADP), adenosine triphosphate (hereinafter designated as ATP) and guanosine phosphate in general sufficiently absorbed by the resin, therefore none of such impurities comes into the NAD fraction.

The purified NAD can be recovered easily from the aqueous solution by any of the conventional recovery steps to yield the purified NAD product.

According to a preferred feature of the present invention, the crude NAD solution is first contacted with the free form of a strongly acidic cation exchange resin (e.g. having functional sulphonic acid groups.) prior to the treatment with the weakly basic anion exchange resin in accordance with the present invention.

The crude NAD solution is preferably passed down through a resin column packed with the acidic resin at ambient temperature or lower; whereby substantial amounts of impurities such as part of AMB and most of decomposed products of NAD and intermediates of NAD biosynthesis (e.g., adenine, nicotinic acid, nicotinic acid amide etc.) together with other cations can effectively be retained or absorbed within the resin, while NAD and the rest of other nucleotides are passed off in the effluent. Meanwhile the pH of the effluent containing NAD and other nucleotides is kept at not more than about 2.0 without any additional acid treatment, thereby preventing any possible decomposition of NAD. In this manner, the obtained effluent is further treated by passing it through the anion exchange resin bed to remove the rest of the impurities. In this preferred method, the acidifuration step aids in the removal of the impurities. It is also preferred to adjust the pH of the crude NAD solution to a lower pH of about 2.0 or lower even before the treatment of the crude solution with the said strongly acidic cation exchange resin.

The process of this invention can be advantageously utilized for obtaining better quality of NAD from such aqueous solutions as fermentation broths which contains cationic impurities like metal ions, amino acids, nucleic acid bases, nicotinic acid, nicotinic acid amide, etc.

Any strongly acidic cation exchange resin with sulfonic acid functional groups can be utilized in the preferred embodiment of this invention to acidify the crude aqueous solution of NAD and aid in the purification of the crude solution. Typical acid resin which can be utilized in this invention include Diaion SK 1A, Dowex 50W, Amberlite IR 120 (trade names of the strongly acidic cation exchange resins with active sulfonic acid group available from Mitsubishi Kasei Kogyo K.K., Japan; Dow Chemical Co., U.S.A.; and Rohm & Haas Co., U.S.A., respectively).

The following examples illustrate, but do not limit, the invention.

Example I

By the treatment with 1-N caustic soda, Duolite A-2 (a trade name of a weakly basic anion exchange resin available from Chemical Process Co., U.S.A.) was regenerated into the free base form. Two resin columns (diameter—15 cm.) were prepared by packing 20 liters of the regenerated resin into each of the columns. Both of the resin columns were washed thoroughly with water, until the pH of the effluent reached to 7.5. Into the first column was passed a crude NAD solution having a pH of 0.9 (NAD—2.25 mg./ml.; ATP 2.5 mg./ml.; ADP 0.8 mg./ml.; and AMP 1.5 mg./ml.; total volume 200 l.) with a space velocity of 1. The initial effluent from the first column contained no other nucleotide than NAD. After the NAD was found in the effluent, a first fraction of 60 liters were collected from the first column. The second column was then connected in series with the end of the first column, so that the remaining crude solution was passed through the first and second columns in series relationship. After this solution was passed through the columns, 80 liters of water was additionally passed through the columns with the same speed to obtain a second fraction of 180 liters containing NAD from the second column. The effluent which was obtained by being passed through the two columns contained no other nucleotides than NAD. The two fractions were combined to provide 240 liters of solution. This solution had a NAD conecntration of 1.5 mg./ml.

Example II

By the treatment with 1-N caustic soda, Duolite A-7 (a trade name of a weakly basic anion exchange resin available from Chemical Process Co., U.S.A.) was regenerated into the free base form. Two resin columns (diameter—15 cm.) were prepared by packing 20 liters of this regenerated resin into each of the columns. The resin columns were washed with water and then each 40 liters of 0.2 mol aqueous solution of ammonium chloride was passed down through each of the column respectively to make the pH of the washings 6.0. After the columns were washed thoroughly with water, a portion of a crude NAD and other nucleotides-containing solution (NAD 2.0 mg./ml.; ATP 2.2 mg./ml.; ADP 1.1 mg./ml.; and AMP 1.4 mg./ml.; total volume 200 l.)

having a pH of 0.9 was passed down through the first column with a space velocity of 1. After NAD was detected in the initial eluate, first fraction of 100 liters was collected which fraction contained pure NAD without the other nuecleotides. After this, the second column was connected in series with the end of the first column so as to pass the residual portion of the crude solution through the first and second columns in series relationship. After the solution was passed through the columns, 100 liters of water was additionally passed through the columns to obtain a second fraction of 180 liters which contained NAD as the only nuecleotide. The two fractions were combined so that the resulting effluent was 280 liters in total. The NAD concentration in this combined effluent was 1.2 mg./ml.

Example III

By the treatment with 1 N caustic soda, Duolite A-2 (a trade name of a weakly basic anion exchange resin available from Chemical Process Co., U.S.A.) was regenerated into the free base form. These resin columns were prepared by packing 20 liters of the regenerated resin in three columns. Each of the resin columns were washed with water and then 40 liters of 0.2 mol aqueous solution of ammonium chloride was passed down through the columns respectively to make the pH of the resin systems in each of the columns 6.0. The columns were washed thoroughly with water. After washing a portion of a crude NAD and other nuecleotides containing solution (NAD 2.2 mg./ml.; ATP 2.3 mg./ml.; ADP 1.2 mg./ml.; and AMP 1.6 mg./ml.; total volume 240 l.) having a pH of 0.9 was passed down through the first column with a space velocity of 1. A first fraction of 60 liters was collected. This fraction contained NAD as its only nuecleotide. After this fraction was collected, the second column was connected with the end of the first column to pass a second portion of the crude solution through the first and second columns in series relationship. After the NAD was found in the initial effluent from the second column, a second fraction of 100 liters was collected. Then the third column was connected with the end of the second column in series relationship. After 25 liters of a water having a pH of 1.0 was passed through the first column, the first column was removed from the system. The residual portion of the crude solution containing NAD and other nuecleotides was passed through the second and third column in series relationship, and afterwards 80 liters of water was passed through the two columns to collect the third NAD containing fraction of 160 liters from the effluent obtained from the third column. There the combined fraction from each of the columns totaled 320 liters. The combined fractions had a NAD concentration of 1.4 mg./ml. and contained no nuecleotides other than NAD.

Example IV

A cultured broth containing NAD was adjusted with sulfuric acid to have a pH of 2 and was filtered. The filtrate contained 3.6 mg./ml. of NAD, together with 1.6 mg./ml. AMP; 1.0 mg./ml. ADP; 2.0 mg./ml. ATP; 0.3 mg./ml. adenine; and 0.6 mg./ml. nicotinic acid amide as impurities. 120 liters of the filtrate was passed in downflow-wise at a space velocity of 2 through a column having a diameter of 15 cm. packed with 30 liters of the free acid form of Diaion SK#1A (a trade name of the strongly sulfonic acid type cation exchange resin available from Mitsubishi Kasei Kogyo K.K., Tokyo, Japan), and then deionized water was passed through the resin at the same velocity. The first 15 liters of the effluent which was collected was discarded while the next 210 liters of the same effluent was recovered.

The recovered effluent had a pH of 1.0 and contained 1.95 mg./ml. of NAD. It contained nuecleotides such as AMP, ADP and ATP, but neither adenine nor nicotinic acid amide.

Two columns each having a diameter of 15 cm. were packed with each 20 liters of a weakly basic anion exchange resin which was Duolite A-7 (a trade name of a weakly basic anion exchange resin available from the Chemical Process Co., U.S.A.). The resin was previously regenerated by 1 N caustic soda, washed with water and then washed with 2 times its volume of an aqueous solution of ammonium chloride. A portion of the aforementioned recovered effluent from the strongly acidic cation exchange resin was passed at a space velocity of 1 through the first column. When NAD appeared in the effluent, 100 liters of the fraction of the effluent was recovered. After this the two columns were connected in series, through which the remaining portion of the solution was passed. Immediately after this, the column was washed with a deionized water passed at the same velocity. From the second column, 180 liters of a second fraction which contained only NAD was recovered. The total volume of NAD fractions was 280 liter, and the NTD concentration was 1.22 mg./ml. Other nuecleotides such as AMP, ADP and ATP were not observed in the combined fraction.

Example V

One hundred-twenty liters of a culture broth filtrate (pH 7.0) containing 2.6 mg./ml. of NAD together with 1.4 mg./ml. of AMP; 0.8 mg./ml. of ADP; 2.1 mg./ml. of ATP; 0.4 mg./ml. of adenine and 0.5 mg./ml. of nicotinic acid was passed in downflow-wise at a space velocity of 2 through a colunm having a diameter of 15 cm. packed with 30 liters of the free acid form of Dowex 50 Wx12 (a trade name of the strongly acidic sulfonic acid type cation exchange resin available from Dow chemical Co., U.S.A.). After this deionized water was successively passed through the column at the similar velocity. The first 15 liters of the effluent which was collected was discarded and the next 180 liters of the same was recovered.

The recovered effluent had a pH of 1.0 and contained 1.70 mg./ml. of NAD. It contained nuecleotides such as AMP, ADP and ATP, but neither adenine nor nicotinic acid.

Two columns each having a diameter of 15 cm., were packed with each 20 liters of a weakly basic anion exchange resin, Duolite A-7 (a trade name of the weakly basic anion exchange resin available from the Chemical Process Co., U.S.A.). This resin had been previously regenerated to the free form by passing 1 N caustic soda through the column washing the resin with water and then washing the resin with two times its volume in the aqueous solution of ammonium chloride.

A portion of the aforementioned recovered affluent from the strongly acidic cation exchange resin column was passed at a space velocity of one through the first column. When NAD appeared in the affluent, a 100 liter fraction of this effluent was recovered. After this the second column was connected with the first column in a series relationship. Through these columns the remaining portion of the solution and deionized water passed at the same velocity. From the second column, a 150 liters fraction was recovered. The total volume of NAD fractions was 250 liters and the NAD concentration in both fractions was 1.05 mg./ml. Other nuecleotides such as AMP, ADP and ATP were not observed in the fractions.

What is claimed is:

1. In a process for the recovery of nicotinic acidamide-adenine-dinucleotide in pure form from an aqueous solution which solution in addition to said nicotinic acidamide-adenine-dinucleotide includes decomposed products of said adenine-dinucleotide, various nucleotides, intermediates of the biosynthesis of said adenine-dinucleotide and other impurities, the improvement which comprises removing the impurities by first adjusting the pH of said aqueous solution to a value of not greater than 2.0 and then passing said solution through a bed containing a weakly basic anionic exchange resin which has been regenerated to its free base form and which has been washed with water or with a salt solution until the washings therefrom are at a pH of less than 9, so as to absorb said impurities from said aqueous solution thereby to recover said nicotinic acidamide-adenine-dinucleotide in the earlier fractions of the effluent.

2. The process of claim 1 wherein the pH of said solution is first adjusted to a value of not greater than 1.0.

3. The process of claim 1 wherein said anionic exchange resin has functional groups selected from the group consisting of primary, secondary, tertiary amino groups in its skeletal structure.

4. The process of claim 1 wherein said aqueous solution is a fermenation broth.

5. The process of claim 1 wherein said salt solution contains at least one member selected from the class consisting of $NaCl, NH_4Cl(NH_4)_2SO_4$ and their mixture.

6. In a process for the recovery of nicotinic acidamide-adenine-dinucleotide in pure form from an aqueous solution which solution in addition to said adenine-dinucleotide includes decomposed products of said adenine-dinucleotide, various nucleotides, intermediates of the biosynthesis of said adenine-dinucleotide and other impurities, the improvement which comprises removing the impurities by first passing the aqueous solution through a bed containing a strongly acidic cation exchange resin in its free acid form, adjusting the pH of the effluent therefrom to a value of not greater than 2, passing said aqueous solution through a bed containing a weakly basic anion exchange resin, which has been regenerated to its free base form, and which has been washed with water or with a salt solution until the washings therefrom are at a pH of less than 9, so as to adsorb said impurities from said aqueous solution thereby to recover said nicotinic acidamide-adenine-dinucleotide in the earlier fractions of the effluent.

7. The process of claim 6 wherein the pH of said solution is first adjusted to a value of not greater than 1.0.

8. The process of claim 6 wherein said anionic exchange resin has at least functional groups selected from the group consisting of primary, secondary, tertiary amino groups in its skeletal structure.

9. The process of claim 6 wherein said aqueous solution is a fermentation broth.

10. The process of claim 6 wherein said salt solution contains one or more members selected from the class consisting of $NaCl$, $NH_4Cl$, $(NH_4)_2SO_4$ and their mixture.

References Cited

UNITED STATES PATENTS

| | | | |
|---|---|---|---|
| 3,140,281 | 7/1964 | Okunuki et al. | 260—211.5 |
| 3,147,185 | 9/1964 | Charney | 260—211.5 |
| 3,157,637 | 11/1964 | Khym | 260—211.5 |
| 3,215,687 | 11/1965 | Tsuchiya et al. | 260—211.5 |
| 3,300,477 | 1/1967 | Jacobs et al. | 260—211.5 |

LEWIS GOTTS, *Primary Examiner.*

J. R. BROWN, *Assistant Examiner.*